US008092689B2

(12) United States Patent
Gosselin (10) Patent No.: US 8,092,689 B2
(45) Date of Patent: Jan. 10, 2012

(54) STYRENE REDUCTION AGENT

(76) Inventor: Michel Gosselin, Clinton, CT (US)

( * ) Notice: Subject to any disclaimer, the term of this patent is extended or adjusted under 35 U.S.C. 154(b) by 0 days.

(21) Appl. No.: 12/891,450

(22) Filed: Sep. 27, 2010

(65) Prior Publication Data

US 2011/0180490 A1    Jul. 28, 2011

Related U.S. Application Data

(62) Division of application No. 11/440,897, filed on May 25, 2006, now Pat. No. 7,892,448.

(60) Provisional application No. 60/684,917, filed on May 25, 2005.

(51) Int. Cl.
```
C02F 1/72     (2006.01)
A62D 3/38     (2007.01)
A62D 3/30     (2007.01)
A62D 101/20   (2007.01)
C01B 15/08    (2006.01)
```

(52) U.S. Cl. ............. 210/759; 252/186.21; 252/186.27; 252/186.29; 252/186.43; 252/186.22; 588/320; 588/405; 210/758; 138/97; 138/98

(58) Field of Classification Search .............. 138/97, 138/98; 210/758, 759
See application file for complete search history.

(56) References Cited

U.S. PATENT DOCUMENTS

| | | | | | |
|---|---|---|---|---|---|
| 4,009,063 | A | * | 2/1977 | Wood | 156/71 |
| 4,170,637 | A | * | 10/1979 | Pum | 424/62 |
| 4,301,264 | A | * | 11/1981 | Moore et al. | 526/86 |
| 5,116,388 | A | * | 5/1992 | Brooks | 8/405 |
| 5,432,219 | A | * | 7/1995 | Shiueh et al. | 524/291 |
| 5,560,750 | A | * | 10/1996 | Crews et al. | 8/431 |
| 5,688,867 | A | * | 11/1997 | Scheibelhoffer et al. | 525/168 |
| 5,965,672 | A | * | 10/1999 | Agari et al. | 525/446 |
| 6,220,747 | B1 | * | 4/2001 | Gosselin | 366/152.3 |
| 6,620,408 | B2 | * | 9/2003 | Hoeffkes et al. | 424/62 |
| 6,703,004 | B2 | * | 3/2004 | Narasimhan et al. | 424/62 |
| 7,131,791 | B2 | * | 11/2006 | Whittaker et al. | 405/184.2 |
| 7,465,410 | B2 | * | 12/2008 | Martin et al. | 252/186.25 |
| 7,820,069 | B2 | * | 10/2010 | Gosselin | 252/186.22 |
| 7,892,448 | B2 | * | 2/2011 | Gosselin | 252/186.22 |
| 2002/0139957 | A1 | * | 10/2002 | Matsuo et al. | 252/186.1 |
| 2003/0135937 | A1 | * | 7/2003 | Barrass et al. | 8/408 |
| 2004/0175235 | A1 | * | 9/2004 | Whittaker et al. | 405/51 |
| 2004/0216759 | A1 | * | 11/2004 | Elmer et al. | 132/270 |
| 2005/0004318 | A1 | * | 1/2005 | Ohshiro et al. | 525/329.1 |

(Continued)

OTHER PUBLICATIONS

"Odour Control-More than Sewage when Installing Cured-In-Place Pipe Liners" NASTT No-Dig, Mar. 2004, Gerry Bauer, P. Eng. & David McCartney, P. Eng., City of Ottawa.*

(Continued)

Primary Examiner — Joseph D Anthony
(74) Attorney, Agent, or Firm — Ober, Kaler, Grimes & Shriver; Royal W. Craig (57) ABSTRACT

A method of reducing styrene emissions in aqueous cured-in-place pipe closed molding processes and other aqueous environments using a styrene reduction agent. The reduction agent generally comprises a calibrated mixture of salts including sodium chloride plus three persulfate salts: ammonium (APS), potassium (KPS), and sodium (NPS). These ingredients are combined in powder form and are compressed into soluble capsules containing calibrated amounts of the mixture. The capsule(s) may be prescribed through the use of software. Capsule(s) are added to the cure water prior to starting the boiler equipment for the Cured-In-Place Pipe process in order to reduce the residual monomer content in either process or waste streams.

23 Claims, 6 Drawing Sheets

| Pipe Diameter (inches*) | Length (feet) | Process** Time (hours @ 180°F) |
|---|---|---|
| 8.0 | 800 | 6.0 |

Input data in yellow boxes

| Amount of styrene in the process water (ppm) +- 5% | Amount of water used**** (gallons) | Amount of styrene present in the water (gallons) | Amount of styrene present in the water (pounds) |
|---|---|---|---|
| 253 | 1,873.6 | 0.52 | 3.94 |
| | 3x Cooling 5,621 | | |

| Amount of styrene in the process water after addition*** (ppm) | Percent Styrene Reduction | StyRedux™ amount to add to the process water (Capsules) |
|---|---|---|
| 26 equal to or lower | 90% | 4 |

Amount of styrene present in the water after treatment (pounds)
0.41
equal to or lower

U.S. PATENT DOCUMENTS

| | | | |
|---|---|---|---|
| 2006/0041056 A1* | 2/2006 | Sunagawa et al. | 525/7.4 |
| 2006/0197057 A1* | 9/2006 | Martin | 252/188.1 |
| 2006/0269492 A1* | 11/2006 | Narasimhan et al. | 424/62 |
| 2006/0270761 A1* | 11/2006 | Gosselin | 523/514 |
| 2007/0000070 A1* | 1/2007 | Vena et al. | 8/405 |
| 2011/0180490 A1* | 7/2011 | Gosselin | 210/758 |

OTHER PUBLICATIONS

"STYRID Styrene Vapor Suppression Additive Technical Guidelines", SPC Specialy Products CO., 1691 California Ave. corona, CA 92881 (2011).*

* cited by examiner

Input data in yellow boxes

| Pipe Diameter (inches*) | Length (feet) | Process** Time (hours @ 180°F) |
|---|---|---|
| 8.0 | 800 | 6.0 |

| Amount of water used***** (gallons) |
|---|
| 1,873.6 |
| 5,621 |

3x Cooling

Amount of styrene in the process water (ppm) +- 5%
253

| Amount of styrene present in the water (gallons) |
|---|
| 0.52 |

| Amount of styrene present in the water (pounds) |
|---|
| 3.94 |

Amount of styrene in the process water after addition* (ppm)**
26
equal to or lower

| Percent Styrene Reduction |
|---|
| 90% |

| StyRedux™ amount to add to the process water (Capsules) |
|---|
| 4 |

| Amount of styrene present in the water after treatment (pounds) |
|---|
| 0.41 |
equal to or lower

FIG. 1

Thermoplastic film (0.01") styrene weight gain over time @ temperature

| Temperature,°F | After 1 hour | After 2 hours | After 3 hours | After 4 hours | Average | Sigma |
|---|---|---|---|---|---|---|
| 65 | 17.8% | 18.5% | 19.0% | 19.0% | 18.6% | 0.5% |
| 100 | 30.4% | 29.5% | 29.7% | 29.5% | 29.8% | 0.4% |
| 120 | 39.2% | 38.8% | 39.1% | 37.9% | 38.7% | 0.6% |
| 140 | 51.6% | 49.7% | 50.9% | 50.2% | 50.6% | 0.8% |
| 160 | 73.8% | 70.3% | 67.4% | 65.6% | 69.3% | 3.6% |
| 180 | 107.2% | 106.0% | 78.3% | 83.0% | 93.7% | 15.1% |

\* Calculations are based upon a 93% composite diameter of the host pipe with a 0.01" thick thermoplastic coating
\*\* Time wate

| Temperature,°F | Weight Absorption |
|---|---|
| 150 | 30.0% |

| 3.1325 | grams of styrene per linear in² |

Amount of styrene in process water [3.94] pounds [0.52] gallons, plus or minus 5%

Amount of water in host pipe [15,172.2] pounds [1,823.6] gallons

Amount of water in boiler and hoses [416.0] pounds [50.0] gallons

Styrene in process water [253] ppm, plus or minus 5%

Ammonium peroxydisulfate CAS# 7727-54-0
Molar mass 228.2
Assay 99%, Active oxygen content 7.0%

Potassium peroxydisulfate CAS# 7727-21-1
Molar mass 270.3
Assay 99%, Active oxygen content 5.9%

Sodium peroxydisulfate CAS# 7775-27-1
Molar mass 238.1
Assay 99%, Active oxygen content 6.7%

| | Low Weight | High Weight | Average Weight | A.O.C. |
|---|---|---|---|---|
| APS | 30.5% | 35.5% | 32.5% | 2.3% |
| KPS | 30.5% | 35.5% | 32.5% | 1.9% |
| NPS | 30.5% | 35.5% | 32.5% | 2.2% |
| Salt | 0.0% | 5.0% | 2.5% | 0.0% |
| | 91.5% | 111.5% | 100.0% | 6.4% |
| | 107.3 grams | | 27.3 grams | 4 capsules |

6 phr persulfates to 100 parts styrene
* Calculations are based upon a 93% composite diameter of the host pipe with a 0.01" thick thermoplastic coating
** Time wate

STYRENE REDUCTION AGENT

CROSS-REFERENCE TO RELATED APPLICATION(S)

The present application is a divisional application of U.S. patent application Ser. No. 11/440,897 filed May 25, 2006 now U.S. Pat. No. 7,892,448 from which it derives priority and which is incorporated herein by reference. U.S. patent application Ser. No. 11/440,897 in turn derives priority from U.S. Provisional Application No. 60/684,917 filed May 25, 2005 which is likewise incorporated herein by reference.

BACKGROUND OF THE INVENTION

1. Field of Invention

The present invention relates to the reduction of residual styrene from a thermoset resin and, more particularly, to a styrene polymerization agent in aqueous environments that effectively and economically reduces styrene emissions and effluents in moist environments.

2. Description of the Prior Art

The composites industry today is experiencing significant growth as an ever-increasing number of industry applications are being found for reinforced plastics. This is largely owing to the durability, strength, cost and expected lifetime of such plastics. One application in particular is the Cured-In-Place Pipe (CIPP) industry, in which piping systems are repaired through the application of resin compounds to damaged pipe surfaces while the pipes remain buried underground. Underground pipes are used for the transport of petroleum, natural gas, chemicals, municipal water, and the like. Due to exposure to a number of influences over time such as, for example, temperature fluctuations, ground movements, corrosive fluids, etc., these pipes tend to crack and damage. As a result, the pipes often are unable to successfully transport the above mentioned fluids and thus become unsuitable for their intended use. The Cured-In-Place Pipe (CIPP) method for repair can solve this problem without expensive excavation. For example, U.S. Pat. No. 4,009,063 by Wood issued Feb. 22, 1977 shows a method of lining pipe with a hard, rigid pipe of thermosetting resin using a tubular fibrous felt immersed in the resin to form a carrier for the resin. The immersed felt and resin are expanded by an inflatable tube to shape the resin to the passageway surface until the resin is cured to form a hard, rigid lining pipe with the felt embedded therein. The resin is a thermosetting resin which contains a catalyst, and hot air, water, a combination of air and water or ultraviolet light (UV) is used to activate the catalyst or UV initiator causing the resin to cure and form a rigid liner.

Another approach involves utilizing glass fiber which is woven into a tubular shape. The glass fiber is impregnated with a thermosetting resin containing a catalyst, and the resin is then cured. Carbon fiber may be interwoven with the glass fiber such that curing may be accomplished by applying an electrical current to the carbon fibers to generate heat. As a result, the catalyst is activated and the resin cures forming a rigid pipe lining. In this instance, hot air or hot water is not required.

There are still other methods that rely on UV curing. In all such cases the higher temperature or light provides the energy to cure the thermosetting resin, causing it to harden into a structurally sound, jointless pipe-within-a-pipe. Unfortunately, during the curing process, the curing water/condensate becomes contaminated with styrene that has permeated through the film coating material. Indeed, the leaching of styrene through the coating material is apparent as an oily substance on the coating even prior to installation. This poses grave environmental health concerns for air emissions as well as process effluents released downstream, into treatment plants, or in the case of storm sewer rehabilitation: streams, rivers, lakes, public and private water supplies. During the process, employee and public safety is at risk.

Employee exposure is tightly regulated by an Occupational Safety and Health Administration (OSHA) workplace airborne threshold limit value (TLV) of 50 parts per million (ppm) in many states. Releases to the air are regulated by the Clean Air Act (CAA) National Emission Standards for Hazardous Air Pollutants (NESHAP) for plastic composites and boat manufacturing. Releases to the water are regulated by the Clean Water Act (CWA). The Environmental Protection Agency (EPA) and the local Department of Environmental Protection (DEP) agencies have styrene listed as a reportable hazardous chemical. California has listed styrene as a carcinogen. Other states have styrene listed as a possible carcinogen and a marine pollutant. Compliance to regulating authorities can only be met by cost-effectively implementing pollution preventive methods and technologies that reduce toxic and hazardous emissions.

The problem is highlighted in the following article: "Odour Control—More than Sewage when Installing Cured-In-Place Pipe Liners", NASTT No-Dig, March 2004, Gerry Bauer, P. Eng. & David McCartney, P. Eng, City of Ottawa. The City of Ottawa Canada identified five sections of sewer for rehabilitation by a cured-in-place pipe methods. The contract was tendered, but during lining of the initial sections, numerous complaints were received from the public regarding an unpleasant odor in their homes. Investigations revealed that the odor complaints occurred as a result of styrene. The solution mentioned in this report was to dilute the air concentration with equipment, fans above a manhole. Regulatory agencies require reduction at the source means and not by dilution. No testing on the release water was implemented.

Another problem highlighting Cured-In-Place Pipe emissions is: "Fumes From Va. Sewer Work Cited In Illnesses", Washington Post Staff Writer, Annie Gowen, May 12, 2004, Page B08. The residents of the Warwick Village neighborhood of Alexandria, Va. were affected by styrene fumes from a CIPP application to their sanitary sewer system. High concentrations were reported on hoses used in the operation, no testing from the source have been reported.

Yet another problem where health officials were called in to investigate, Schlitz Park Office Building, Milwaukee County, Wis. Styrene fumes entered the building through drains and foundation walls. Employees were evacuated and some missed work for months. Fans were used to create airflow to dilute concentrations of styrene. Process water testing at the source was not part of the investigation.

"Styrene is a common chemical component used in rubber and plastics industries to make packaging, insulation and fiberglass products. It is also associated with combustion processes such as automobile exhaust and cigarette smoke. The odor threshold for styrene has been reported to be 50 parts per billion (Plog 1988). It has been described as having a sweet, sometimes irritant odor. It is slightly soluble in water and is volatile. The most common health effects associated with styrene exposure are mucous membrane irritation and central nervous system effects (e.g. depression, concentration problems, muscle weakness, tiredness, and nausea). Recovery short term effects is typically rapid upon removal from exposure (ATSDR 1992)". Health Consultation, Schlitz Park Office Building, Wis., Sep. 13, 2005, U.S. Department of Health and Human Services, Agency for Toxic and Disease Registry, Devision Of Health Assessment and Consultation, Atlanta, Ga.

There are conventional styrene reduction strategies including the following:

1. Using low styrene content resins: Although many of these resins are currently available from resin suppliers, this method does not lend to every process, and the physical properties of the final product can be affected. In some instances, the reduction of styrene is not significant enough to make a difference, and in some cases, styrene emissions may even increase.

2. Using controlled spay-on techniques is another method for reducing styrene emissions. This method is very effective and works by controlling the amount of surface area of the wet resin which is exposed to the air, whether spraying gel coat or plain resin.

3. Addition of paraffin wax is another method of reducing styrene emissions. This suppresses styrene emissions through the film it provides but, in doing so, creates the problem of secondary bonding between the laminates which can cause the further delamination of the composite resulting in a structural weakness.

4. Using alternate monomers is a forth method of reducing styrene emissions. Alternate monomers such as methyl methyl methacrylate, vinyl toluene and butyl styrene can be used, or it is possible to use olygomers, which basically consist of two or three molecules that have been combined. They work effectively but can be very expensive and, in addition, some can be more toxic than styrene or made from styrene derivatives, also considered HAP and VOC compounds.

5. Using a closed molding process is another method. This can be extremely effective in lowering styrene emissions, but equipment cost and maintenance cost is a great disadvantage.

6. Using a styrene suppressant is another option.

Further to option 6, a number of styrene suppressant additives are currently available to the composite fabricator. They are most effective when using the open-molding processes and, when properly used, can reduce styrene emissions during the curing stage of the composite. Styrene suppressant agents can effectively and economically reduce styrene emissions when properly used in any open-molding process. Specifically, the advantages of Styrene Reduction in CIPP Cure Water are:

i. No additional equipment needed for as much as a 75% reduction
   ii. Minor equipment needed for reductions above 75%
   iii. Mixing not required, simply add required amount in water soluble packaging
   iv. Non-toxic, Non-Hazardous
   v. Meets all compliance regulations By way of example, Styrid™ is an existing Styrene suppressant additive manufactured by Specialty Products Company to reduce the amount of styrene vapors escaping from the composites. Styrid™ and most other styrene suppressant formulations contain wax and other components that produce a film on the top of the laminate, creating a barrier which prevents styrene, or organic diluents, from leaving the composite in the form of a vapor during the curing stage. Styrid™ creates a film similar to that provided by paraffin wax.

It would be greatly advantageous to preserve all the above-identified qualities of existing Styrene suppressant formulations and yet provide an even higher level of effectiveness, and worker and public safety, with an advantage to economically reduce HAP and VOC emissions.

SUMMARY OF THE INVENTION

It is therefore, a primary object of the present invention to provide a styrene reduction agent, initiator or oxidizer that effectively and economically reduces styrene, or reactive diluent, in Cured-In-Place Pipe, or other surface coating processes.

It is another objective to reach a higher level of effectiveness than prior art reduction agents It is still another objective to simplify the task of implementing the reactive diluent reducing agent directly into the curing medium in a predetermined quantity and an easy-to-calibrate manner.

It is still another objective to remove polymerized reactive diluent along with small concentrations of un-reacted diluents that may remain in the process.

It is another objective to polymerize absorbed reactive diluents on the surface of said coating of reactive diluents either: miscible, soluble in water or non-soluble in water.

These and other objects are accomplished with a new and improved styrene reduction agent that effectively and economically reduces styrene emissions in Cured-In-Place Pipe or other surface coating curing processes. Generally, the invention comprises a calibrated mixture including persulfate salts (Peroxodisulfates), and a method of incorporating them into the Cured-In-Place Pipe process and then removing them from the Cured-In-Place Pipe processes in such a way as to reduce styrene emissions by 75% and more. More specifically, the mixture includes ammonium persulfate (APS) and/or potassium persulfate (KPS) and/or sodium persulfate (NPS) with sodium chloride (NaCL) combined in the following preferred concentrations with acceptable ranges:

| Product | % by weight |
|---------|-------------|
| APS     | 30          |
| KPS     | 35          |
| NPS     | 30          |
| NaCL    | 05          |

The calibrated amounts of the persulfate salt mixture are encapsulated in a water soluble packaging for addition to the cure water. Preferably, the packaging comprises capsules for material handling and product safety. The capsule(s) may be added to the cure water at anytime during the process. For example, the capsule(s) may be added prior to starting the heating equipment, or boiler, for the Cured-In-Place Pipe process in order to reduce the residual monomer, styrene, content in either the process or waste streams. The capsules facilitate quick and ready deployment of the mixture. Safety is a consideration for capsule(s) deployment due to wind and spillage, of the powder form, into the environment or on employee.

DETAILED DESCRIPTION OF THE PREFERRED EMBODIMENT

The present invention is a styrene reduction agent, or "initiator/oxidizer", that effectively and economically reduces styrene emissions and effluents in Cured-In-Place Pipe closed molding processes by means of emulsion polymerization.

Generally, the invention comprises a calibrated mixture of peroxodisulfates, also known as Persulfate salts, and a method of calculating and incorporating them into the Cured-In-Place Pipe process in such a way as to reduce styrene emissions and effluents by as much as 75% or more. In addition to the mixture itself, time and temperature are variables in increasing reduction efficiency and overall conversion of the reactive monomers or diluents.

The general mixture of the present invention is a composite of sodium chloride (NaCl) plus three persulfate salts: ammonium persulfate (APS), potassium persulfate (KPS), and sodium persulfate (NPS). The APS is available as a white crystalline powder which begins to decompose when heated to 120° C. It is known as a strong oxidant and is widely used in the organic synthetic industry as an initiator for polymerization of polymer compounds. The KPS is likewise available as a white crystalline powder, soluble in water, and decomposes at temperatures of approximately 100° C. It too is a strong oxidant and has been traditionally used for chemical bleaching, and as an accelerator for polymerization of vinyl chloride resin emulsion. The NPS is also available as a white, crystalline, odorless salt. NPS is conventionally used as initiator for the polymerization of monomers and as a strong oxidizing agent in many applications. The NaCL is conventional salt. In accordance with the present invention, The APS, KPS, NPS and NaCL are combined in the following relative concentrations:

| Product | Preferred Amt (% by weight) | Optimum Range (% by weight) | Possible Range (% by weight) |
|---------|---|---|---|
| APS | 32.5 | 25-35 | 0-100 |
| KPS | 32.5 | 30-40 | 0-100 |
| NPS | 32.5 | 25-35 | 0-100 |
| NaCL | 2.5 | <10 | 0-10 |

The ingredients are combined in powder form and, in accordance with the present invention, the mixture is compressed into soluble capsules containing calibrated amounts of the mixture. The capsules are used in packaging for dispersion. The capsules are preferably soluble gel capsules (veterinarian grade), size SU-07, the largest currently available. Other types of packaging can be easily deployed including dispensing powder directly, dispensing powder into an inert liquid and then dispensing. Typical weight of one capsule is 30 grams +/−5 grams.

These capsule(s) may then be added to the cure water prior to starting the boiler equipment for the Cured-In-Place Pipe process in order to reduce the residual monomer content in either the process or waste streams. The capsules facilitate quick and ready deployment of the mixture. While the amount per capsule may vary, the size of the capsule or packaging may vary, the composition of the packaging may vary, or the powder may be pre-dispersed in a non-reactive fluid, the specific guidelines for use herein described with a stepwise example.

Step 1. Calculate amount to be used for the CIPP liner. This is accomplished with the assistance of either a software calculator or a predetermined "look-up" table. The software is based on extrapolation from laboratory testing data, and is essentially a spreadsheet equation based on linear progression from absorption and extraction tests.

A. The input variables are as follows:
  i. Diameter of pipe (inches)
  ii. Length of pipe (feet)
  iii. Process time at 180° F. (hours)

B. The outputs from the software are:
  i. Amount of styrene in process water (ppm, gallons, pounds, etc.)
  ii. Amount of process water used (gallons)
  iii. Amount of capsules to add to the water (capsule(s))
  iv. Amount of styrene after treatment (ppm)
  iv. Percent removal accomplished (%)

The software module essentially calculates from the input variables the amount of process water used during the Cured-In-Place Pipe process, and calculates the amount of residual styrene present in the process water from collected data. The software then calculates the amount of residual styrene that will be present in the process water, and calculates the remedial amount of the present mixture.

For example, given input variable as follows:
Diameter: 8"
Length: 800'
Process Time 180° F.: 5 hours
The software output will be as follows:

| | |
|---|---:|
| Amount of styrene in the process water: | 239 ppm |
| Amount of water used for inversion/filling: | 1,873.6 gal |
| Note: General multiplier for cooling: ×3: | 5,621 gal |
| Amount of styrene present in the water: | 0.49 gallons |
| Amount of styrene present in the water: | 3.73 pounds |
| Amount of styrene in the process water after addition: Equal to or lower | 28 ppm |
| Percent Styrene Reduction: | 88% |
| StyRedux ™ amount to add to the process water (1,873.6 gallons) | 4 capsules |
| Amount of styrene present in the water after treatment: (equal to or lower) | 0.44 pounds |

Figure 1:
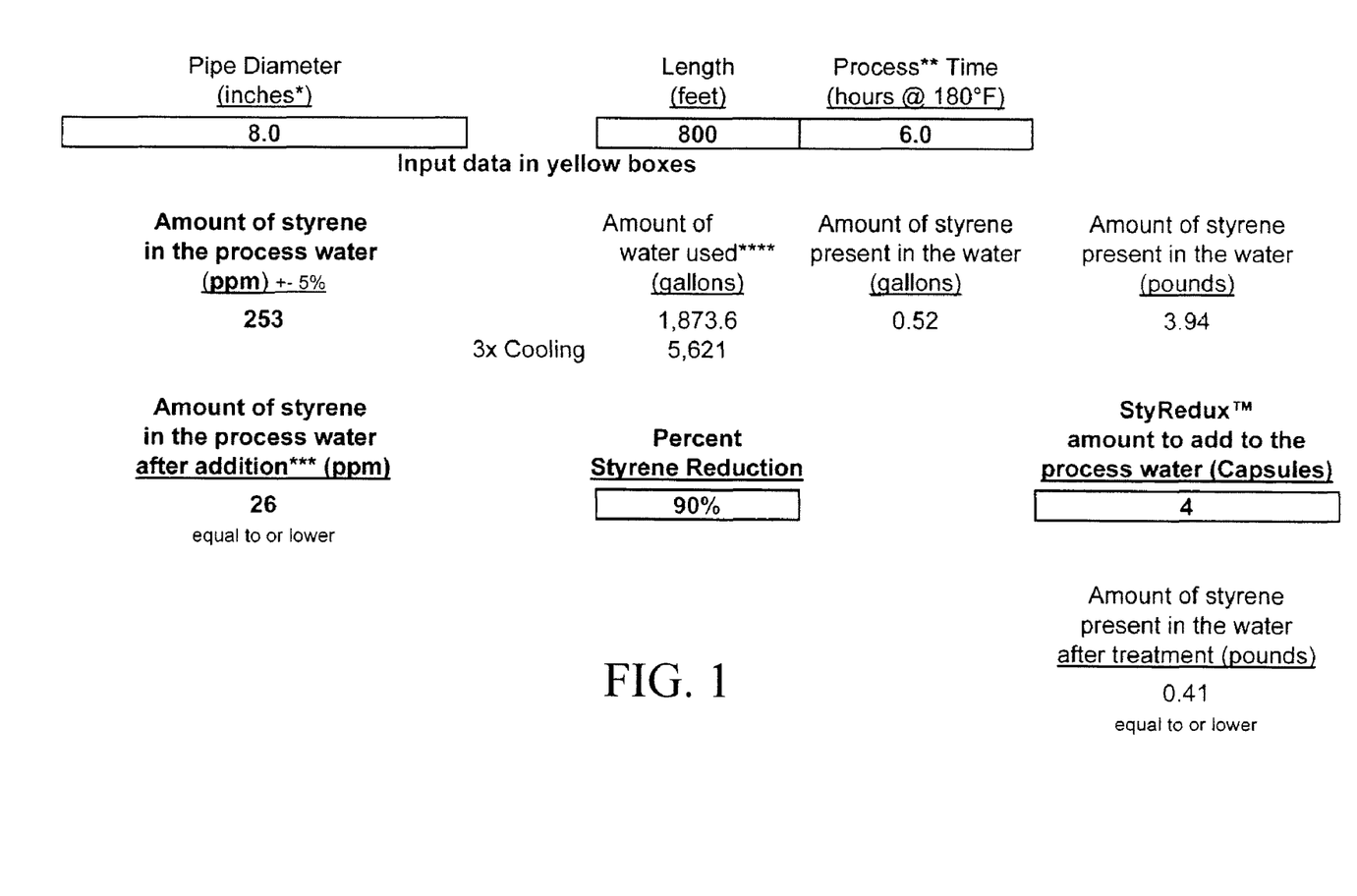
FIG. 1. is a graphical analysis of the calculations for calibrating the amount of the present mixture to be added FIG. 2. is a graphical depiction of the present styrene reduction calculations indicative of the efficacy of the capsules.

FIG. 1 is a spreadsheet analysis of the foregoing calculations for a specific example, which conclude that a total of four (4) capsules of the present mixture (bottom right) should be added to achieve 90% styrene reduction, given 253 ppm styrene in 1,873.6 gallons of process water. Note that cooling water is generally added to reduce the process water below 100 degrees F. prior to release. Holes are put in the terminal end to release water while filling with cooling water. Cooling cycles range from one (1) to three (3) hours but vary according to thickness (thicker liners require longer cool-down cycles) and type of resin system used. The total volume including cooling water is generally 2.5 to 3 times the water used to inflate the liner and hold the liner against the host pipe or surface to be coated, in this example 5,621 gallons. Treatment of 5,621 gallons is calculated by entering 2,454 feet with one hour process time, the result being 6 capsules. If three hour cooling from 180 to 100, then 10 capsules and so on.

Figure 2:
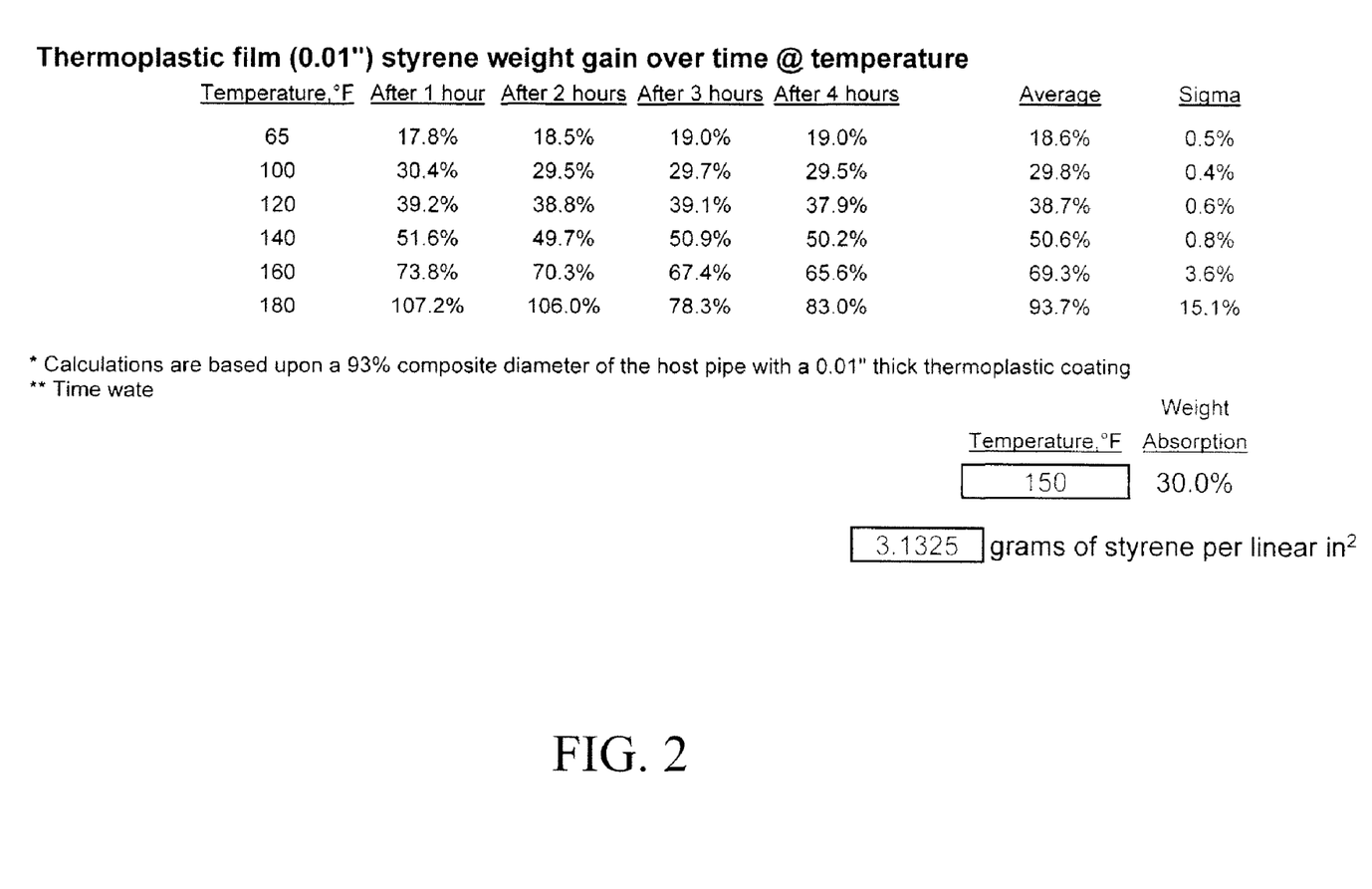

FIG. 2 is a table of styrene absorption rates. Generally, temperatures used to cure the Cured-In-Place Pipe are 180 degrees F., within a range of from 120 F-180 F dependent on the type of initiator used. An assumption and analysis of past gel data produces a theoretical maximum temperature of 150 F prior to resin polymerization. Flux rates can be assumed but for quantitative analysis, a 3.46 linear square inch of polyethylene film was initially weighed at temperature intervals. The weight of the samples are taken on a per hour basis to record weight gain and therefore absorption of the styrene. Styrene weight gain over time is recorded as percentage, the final weight divided by the initial weight. Average values are computed at each temperature versus time and a sigma computed. The results show that the rate of absorption is more dependent on temperature increase than time in solution. The average values, styrene weight gain over time, may then be used for extrapolation. For example, extrapolation at 150 degrees F. would calculate a weight absorption rate of 60%. In Cured-In-Place Pipe, the coating is exposed to the primary curing media on one side only, the interior of the liner. An assumption of 50% of the "weight % absorption" is considered for treatment purposes. The weight % absorption number is variable depending on type of resin used, % styrene or reactive monomer used.

Figure 3:
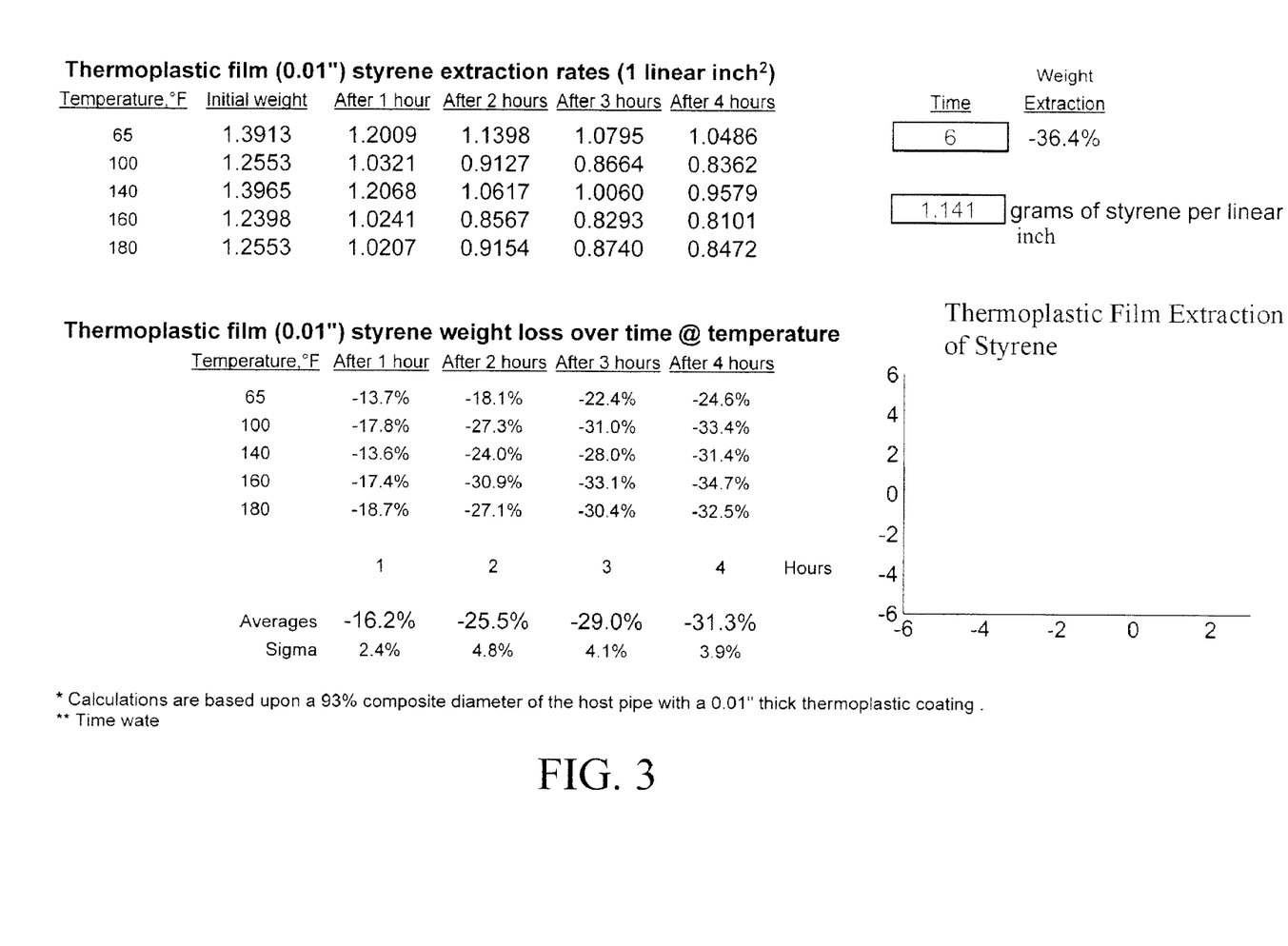
FIG. 3. is a drawing of a StyRedux™ Capture System, when placed into operation will capture, filter, polymerized styrene and non-polymerized styrene.

FIG. 3 is a data table and graphical analysis of thermoplastic film extraction rates and extrapolation. Several single linear square inches of thermoplastic film, 0.01", is weighed to obtain the initial weights. The thermoplastic film is then removed from the temperature environment at different temperatures over time, and is weighed for styrene loss (weight loss). Temperatures recorded are 65, 100, 140, 160 and 180 F. Time intervals are 0, 1, 2, 3, and 4 hours. Another table (at bottom) is then constructed from calculating percent styrene weight loss over time at the specified temperature. Average percentages recorded with their respective standard deviation provided results of dependence on time and temperature. Based on Cured-In-Place Pipe operations, municipal specifications and normal operating procedures, a temperature hold at 180 F is generally three hours (3 HRS). Least squares calculations and based on a trend-line log equation, result a weight extraction of −28.8% and an R squared value of 0.9853. Final calculation is the time weight extraction percent times the amount of styrene absorbed into the thermoplastic film, from FIG. 2 (0.288×3.1325), 0.903 with unit grams of styrene per linear square inch @3 hours.

Figure 4:
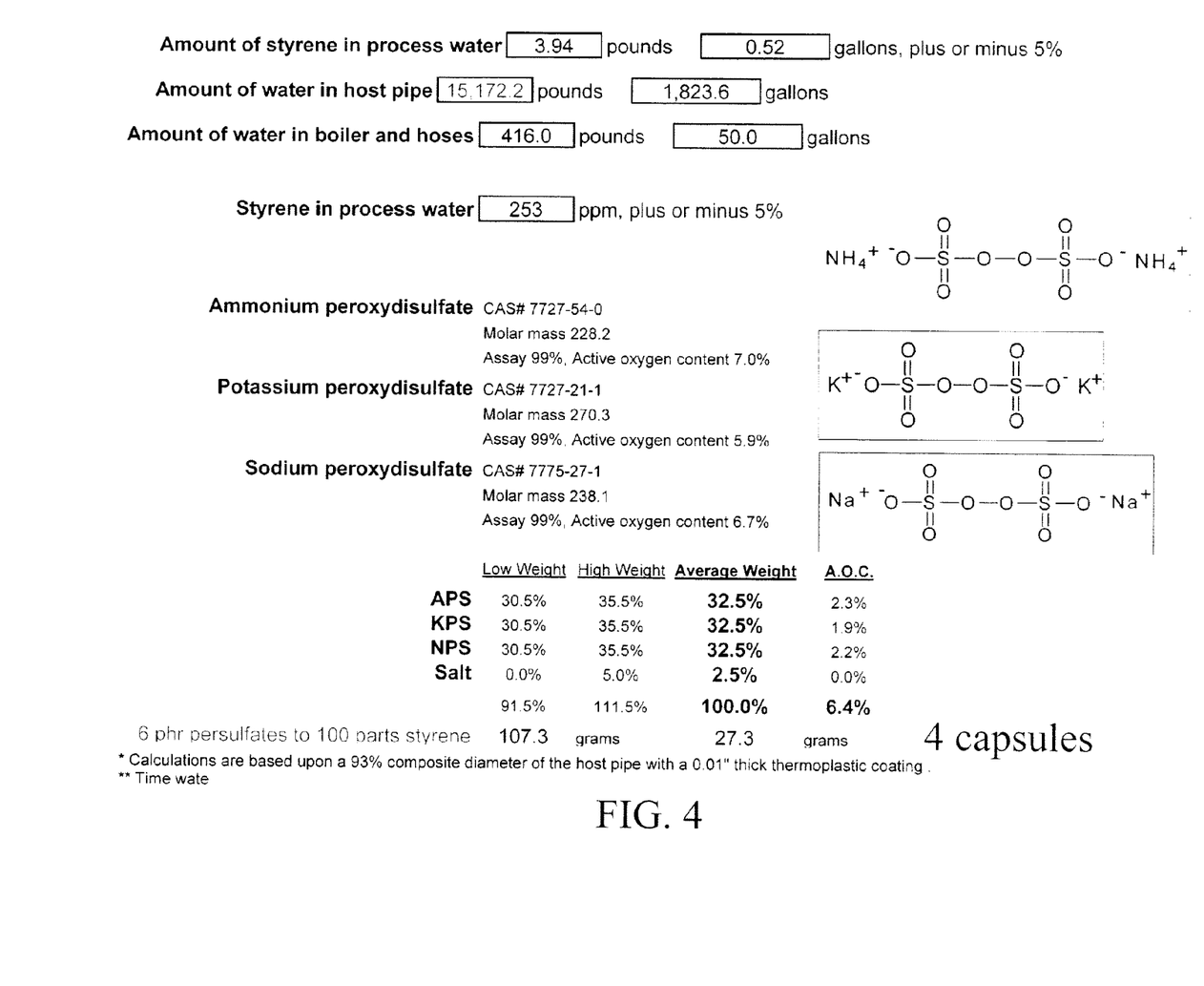
FIG. 4. is a calculation for the amount of styrene in the Cured-In-Place Pipe process water.

FIG. 4. is a calculation for the amount of styrene in the Cured-In-Place Pipe process water using the "Thermoplastic Extraction" number 1.141 grams of styrene per linear inch from FIG. 3. The calculation yields the Amount of styrene in process water, Amount of water in host pipe, Amount of water in boiler and hoses, all in pounds and gallons. Finally, the amount of Styrene in process water is calculated as grams of styrene per linear square inch, and converted into pounds. A pound to gallons conversion for styrene present is simply multiplier by weight per gallon for styrene. Amount of water in host pipe entails a simple volume calculation based on the interior liner diameter, 93% of Host Pipe diameter (nominal dimension) and five feet excess for in and out of manhole (beginning and terminal end). Amount of water in boiler and hoses are rough estimates for boiler hoses variable for each project. The amount of Styrene in process water is a simple conversion for Styrene in Process Water in parts per million (ppm). FIG. 4 also provides specific compositional information for APS, KPS and NPS. Most important to any polymerization rate is the Active Oxygen Content, AOC, for this type of mixing of different AOC's. Time is a factor and based on previous data tables, an AOC of 6.4% is typical. The output "6 phr persulfates to 100 parts styrene" is a calculation of persulfates needed to polymerize the calculated Amount of styrene in process water (at the top of FIG. 4). The weight per capsule (package) and number of capsules (packages) required for deployment are also provided at the bottom.

Figure 5:
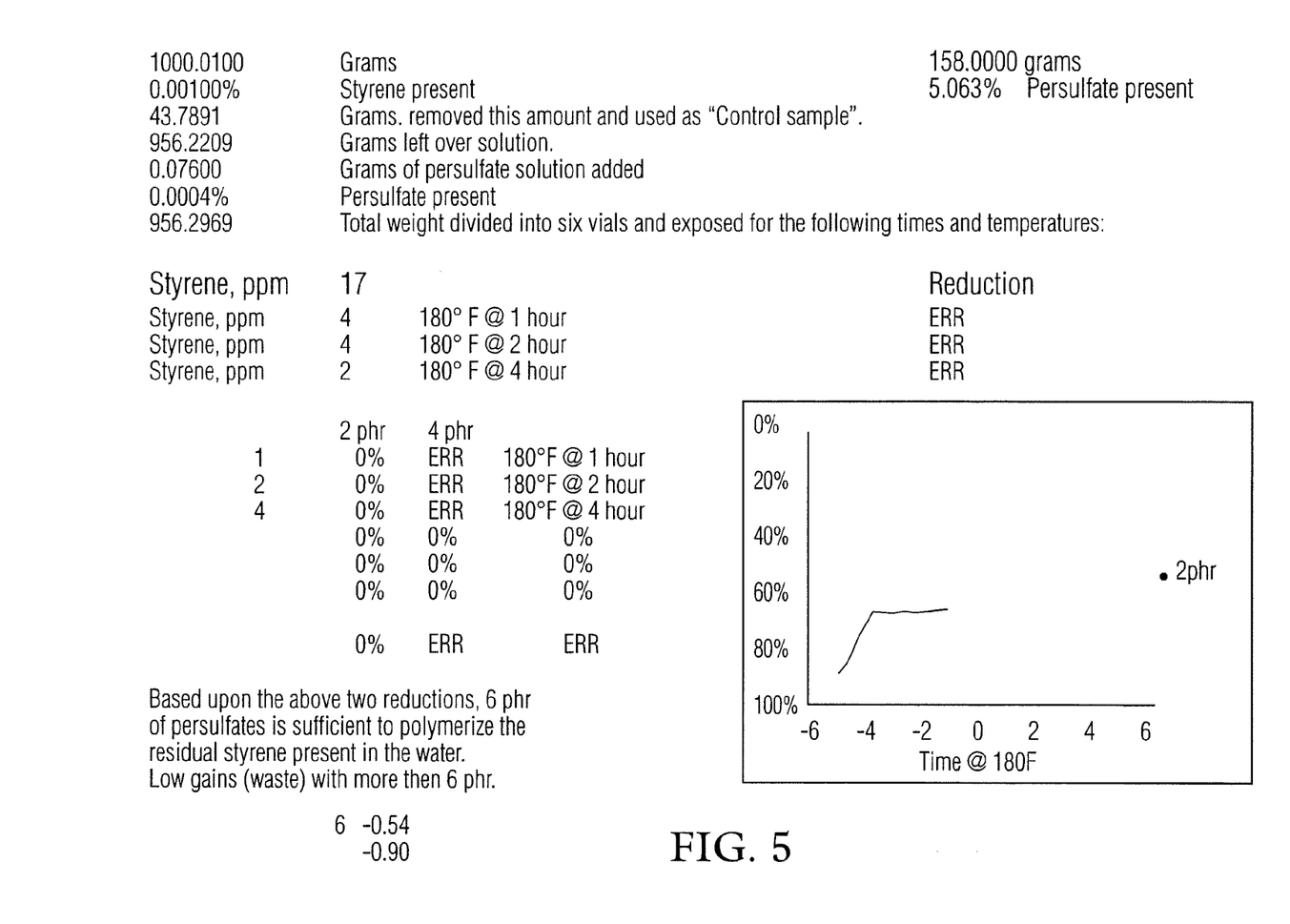
FIG. 5 is data series table and a graphical representation of a polymerization rate series analysis.

FIG. 5 is data series table and a graphical representation of a polymerization rate series analysis. In order to find the polymerization rate of a reactive monomer, a starting point of 100 grams total mixture was assumed: 90 grams water, 4 grams APS, 3 grams NPS, and 3 grams KPS, NaCL non reactive. Average AOC calculated at 6.68% and 10% by weight in solution, or 100,000 ppm with a ph of 2.7 and density of 1.23. half as much persulfate solution was utilized, 5.063%. The styrene water solution was mixed at 0.001% styrene in water and 0.0004% of persulfate solution added. Again a control sample taken, 43.899 grams for GC analysis. The remainder of solution was divided into six vials with three being cured over time. Reductions were recorded. The samples are analyzed, tabulated and plotted for efficiency observation purposes. The graphical analysis suggest a 6 phr is sufficient to polymerize styrene present in water. The graphical representation suggest low gains in reduction above 6 phr and therefore a waste of material as well as downstream chemical releases. From the data and field trials accomplished, conservative 4 phr is used, however upwards of 8 phr in a sanitary sewer rehabilitation can be used if a short time frame for curing is specified. Care must be taken not to raise the ph of the water, not to corrode boiler equipment and not to release any un-reacted chemicals down-stream. With this in mind, a styrene reduction capture system may be employed to polish the water prior to release.

The following is an example calculation of the calibrated amount of persulfate salt mixture capsules for addition to the cure water for a specific Cured-In-Place Pipe process Example 1

Tables 1-2 show an estimation of the calibrated amount of persulfate salt mixture capsules for addition to the cure water for the Cured-In-Place Pipe process product estimation of a 42"×625' pipe. Estimates are based on 15"×220' and 42"×350' historical data. Water usage is twice that of inversion water. Water usage due to: cooling, infiltration, addition to maintain head.

Notes: Theoretical Invertion only: 350'=22,215 gallons, 13 capsules

Actual: Invert+cooling+inflow=44,100 gallons, 25 capsules

TABLE 1

| Hours at 180 F. | Estimate styrene after treatment (ppm) | Amount of capsules |
| --- | --- | --- |
| 9** | 4 | 20 |
| 11 | 3 | 21 |
| 13 | 2 | 22 |
| 15 | 2 | 22 |
| 18 | 1 | 23 |
| 19-20 | 0 | 24 |

1. Estimate water for inversion: 39,386 gallons
2. Estimate Styrene prior to treatment: (55 ppm), 9** hours

TABLE 2

| Hours at 180 F. | Estimate styrene after treatment (ppm) | Amount of capsules |
|---|---|---|
| 9** | 4 | 38 |
| 11 | 3 | 40 |
| 13 | 2 | 42 |
| 15 | 2 | 43 |
| 18 | 1 | 45 |
| 19-20 | 0 | 46 |

Estimate water for Maintaining Head/cooling: 81,531 gallons, 9 hours***

Theoretical calculation for holding tanks when treatment is stopped at 9 hours:
   46−38=8 capsules/full tank (20,000 gallon tanks)
   6 capsules/half tank (10,000 gallon)
   Testing:
   EPA Method 8260B, No preservative (HCL/ACID/BASE),
     Sample 1 at 180 F, Sample 2 at 100 F
Estimate water for inversion: FRAC TANK INFO: 10k, 20k, 30k gallons

| Hours at 180 F. | Gallons | Initial styrene (ppm) | Estimate styrene after treatment (ppm) | Amount of capsules |
|---|---|---|---|---|
| 3 | 10k | 39-54 | 6</= | 4 |
| 6 | | | 5</= | 5 |
| 8 | | | 2</= | 6 |
| 3 | 20k | 39-63 | 6</= | 7 |
| 6 | | | 4</= | 8 |
| 8 | | | 2</= | 9 |
| 3 | 30k | 39-63 | 6</= | 10 |
| 6 | | | 4</= | 12 |
| 8 | | | 3</= | 15 |

Testing:
EPA Method 8260B, No preservative (HCL/ACID/BASE),
   Sample 1 at 180 F, Sample 2 at 100 F
The water may be safely released into a sanitary sewer system at 0.73 ppm after 6 hours.

Figure 6:
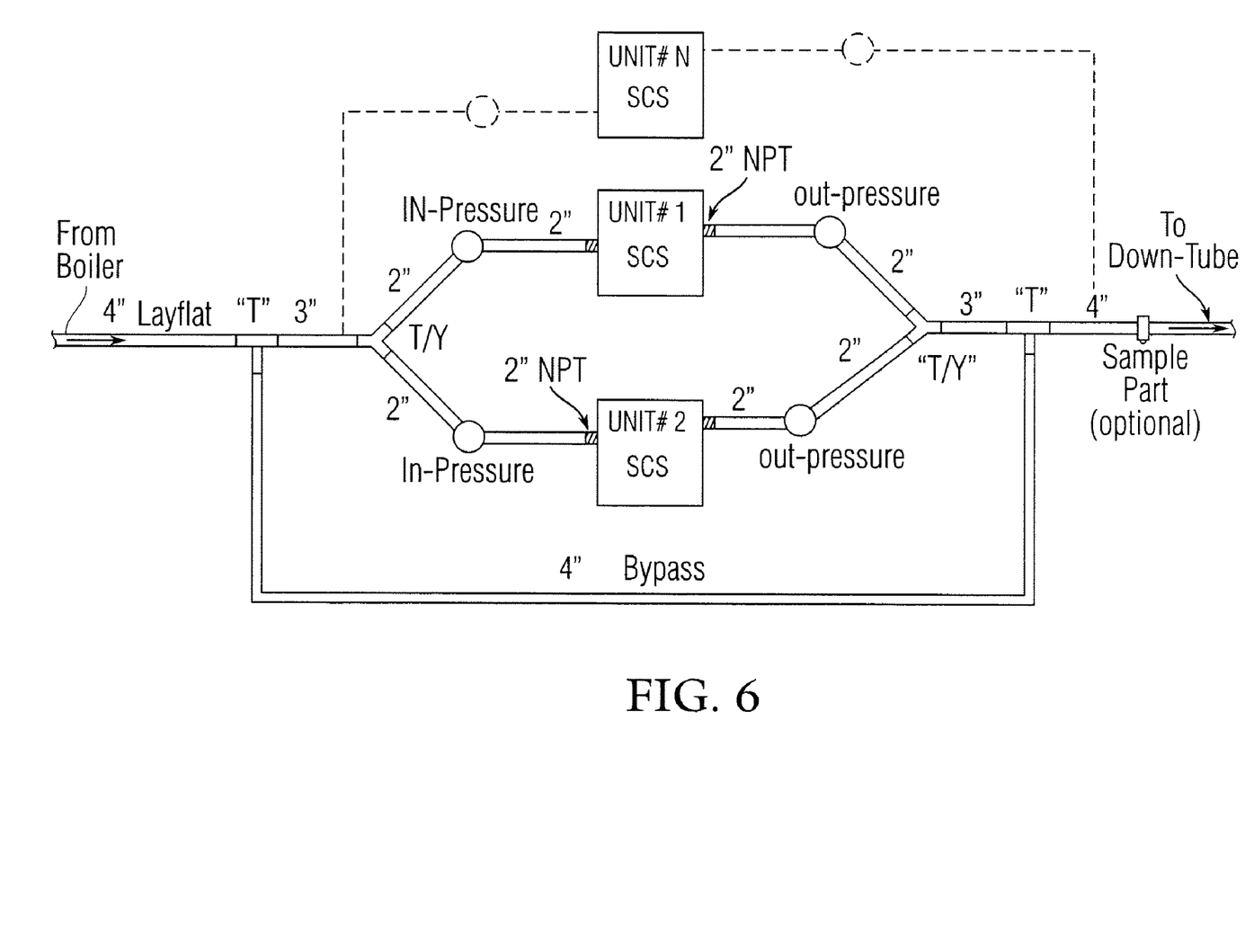
FIG. 6 is a block diagram of a suitable filtering system that may be deployed in unison with the mentioned styrene reducing agent capsules.

FIG. 6 is a block diagram of a suitable filtering system that may be deployed in conjunction with the above-described styrene reducing agent capsules to further remove the polymerized styrene, poly-styrene, in the cure water. The filtering system generally comprises an outlet hose (far left) which is connected from the heat source (boiler) to a bypass valve "T" that provides a selectable bypass around one or more branches to polishing filter units (in the illustrated embodiment two are shown (Units #1 & #2), though one or more may be used. The bypass conduit is used during heating. During cool-down, process water flows are directed into the polishing units #1 & #2. Conventional input and output pressure gauges may be provided at the branch points as shown (circles) to monitor pressure. The polishing units #1-n are filter cartridge housings loaded with filter cartridges. For present purposes, the filter cartridge housings may be commercially available units such as, for instance, McMaster-Carr™ part no. 44395K86 Top-Load, Multi-Filter-Cartridge Housings with 2" pipe junctions, rated at 100 GPM flow and approximately 10½"×49½" in dimension. These may be loaded with part no. 6632T24 polymeric absorbent filter cartridges each rated at 4.0 GPM maximum flow, 40" Cartridge Length, plus one or more part no. 44275K72 stainless steel reusable filter cartridges, 40 Microns or less, 10" L cylindrical filters. Of course, other filter inserts may be used, and depending on the filters used in the filtering system, this will supplement the capsules and catch the small amount of residual styrene in order to reduce toxics to storm-water, ground and or wetlands as well as meeting or exceeding compliance limits. Time and recirculation cycles are important variables prior to releases. Dependent on volume of water, multiple polishing units #1-n can be manifold together to improve flow rates and filter area. The advantages of a supplemental capture system as described above is that the filter media captures the larger molecules of polymerized styrene, a semi-crystallized, hardened material, and therefore clogging is reduced. It is known that activated carbon filtering for styrene has a propensity to clog and further compels lower flow rates and significant contact time. Moreover, costs associated with disposal or cleaning the activated carbon filtering media are high. It is, therefore, more advantageous to employ the above-described equipment (with steel and/or polymeric filter media) in conjunction with the styrene reduction agent capsules to reduce toxics to a minimum while keeping process time low and flow rates high. It must be noted that the best technology or work practices are always defined in relation to a specific company. For example, what might be the best way to minimize waste at one company may be very different from the best methods achieving the same objectives at another company. In each case, what is the "best practice" or "best available technology" will depend on the availability of resources, what materials are processed, how they are processed, what products are made, local community or regulatory requirements, and other factors. However, in all such cases the present invention will provide a styrene reduction agent that effectively and economically reduces styrene emissions in Cured-In-Place Pipe, closed molding processes.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims:

I claim:

1. A method of reducing styrene emissions in aqueous cured-in-place pipe closed molding processes, comprising the steps of:
    initiating a cured-in-place pipe closed molding process that utilizes heated process water to cure said pipe;
    providing a calibrated amount of a styrene reduction agent, said styrene reduction agent including peroxodisulfate;
    introducing said styrene reduction agent to said process water;
    curing said cured-in-place pipe; and
    recapturing said process water.

2. The method of reducing styrene emissions in aqueous cured-in-place pipe closed molding processes according to claim 1, further comprising providing sodium chloride (NaCL) and introducing said sodium chloride to said process water.

3. The method of reducing styrene emissions in aqueous cured-in-place pipe closed molding processes according to claim 1, wherein said styrene reduction agent includes at least one from among the group including ammonium persulfate (APS), potassium persulfate (KPS) and sodium persulfate (NPS).

4. The method of reducing styrene emissions in aqueous cured-in-place pipe closed molding processes according to claim 1, wherein said styrene reduction agent comprises ammonium persulfate (APS), potassium persulfate (KPS) and sodium persulfate (NPS).

5. The method of reducing styrene emissions in aqueous cured-in-place pipe closed molding processes according to claim 2, wherein said persulfate salt(s) and NaCL are formed in a water soluble package.

6. The method of reducing styrene emissions in aqueous cured-in-place pipe closed molding processes according to claim 5, wherein said water soluble package is a capsule of compressed crystalline powder.

7. The method of reducing styrene emissions in aqueous cured-in-place pipe closed molding processes according to claim 4, wherein said styrene reduction agent comprises a range of from 25-35% ammonium persulfate (APS), a range of from 30-40% potassium persulfate (KPS), and a range of from 25-35% sodium persulfate (NPS).

8. The method of reducing styrene emissions in aqueous environments according to claim 7, wherein said styrene reduction agent further comprises and a range of from 0.1 to 10% NaCL.

9. The method of reducing styrene emissions in aqueous cured-in-place pipe closed molding processes according to claim 7, wherein said styrene reduction agent comprises approximately 32.5% ammonium persulfate (APS), approximately 32.5% potassium persulfate (KPS), and approximately 32.5% sodium persulfate (NPS).

10. The method of reducing styrene emissions in aqueous environments according to claim 9, wherein said styrene reduction agent further comprises approximately 2.0% NaCL.

11. The method of reducing styrene emissions in aqueous environments according to claim 7, wherein said styrene reduction agent comprises approximately 30% ammonium persulfate (APS), approximately 35% potassium persulfate (KPS), approximately 30% sodium persulfate (NPS) and approximately 5% sodium chloride (NaCL).

12. The method of reducing styrene emissions in aqueous cured-in-place pipe closed molding processes according to claim 3, wherein said styrene reduction agent comprises a range of from 25-35% ammonium persulfate (APS), a range of from 25-35% potassium persulfate (KPS), and a range of from 0.1 to 10% NaCL.

13. The method of reducing styrene emissions in aqueous cured-in-place pipe closed molding processes according to claim 1, further comprising the steps of:
  determining the amount of styrene in said process water; and
  calibrating the amount of said styrene reduction agent provided as a function of said amount of styrene in said process water.

14. The method of reducing styrene emissions in aqueous environments according to claim 13, wherein said amount of styrene in the process water is determined as a function of the diameter of said cured-in-place pipe, the length of said cured-in-place-pipe, and the process time of said closed molding processe.

15. The method according to claim 1, further comprising a supplemental capture step after said step of introducing said styrene reduction agent to said process water, said supplemental capture step comprising circulating said process water through at least one polishing filtration unit containing at least one filter canister for filtering polymerized styrene in said process water.

16. The method according to claim 15, wherein said supplemental capture step further comprises circulating said process water through at least one polishing filtration unit containing a plurality of filter canisters.

17. The method according to claim 15, wherein said supplemental capture step further comprises circulating said process water through a plurality of polishing filtration units each containing a plurality of filter canisters.

18. The method according to claim 16, wherein said plurality of filter canisters include polymeric absorbent filter cartridges.

19. The method according to claim 16, wherein said plurality of filter canisters include stainless steel mesh filter cartridges.

20. The method according to claim 18, wherein said plurality of filter canisters include a combination of polymeric absorbent filter cartridges and stainless steel mesh filter cartridges.

21. A method of reducing styrene emissions in aqueous environments, comprising the steps of:
  initiating a cured-in-place pipe closed molding process;
  introducing a styrene reduction agent into cure water during said cured-in-place pipe closed molding process, said styrene reduction agent comprising a combination of ammonium persulfate (APS), potassium persulfate (KPS), sodium persulfate (NPS).

22. The method of reducing styrene emissions in aqueous environments according to claim 21, wherein said styrene reduction agent comprises approximately 32.5% ammonium persulfate (APS), approximately 32.5% potassium persulfate (KPS), and approximately 32.5% sodium persulfate (NPS).

23. The method of reducing styrene emissions in aqueous environments according to claim 22, wherein said styrene reduction agent further comprises approximately 2% NaCL.

* * * * *